(12) United States Patent
Matveeva et al.

(10) Patent No.: US 12,171,240 B2
(45) Date of Patent: Dec. 24, 2024

(54) LESS ADDED SUGAR IN BAKED PRODUCTS

(71) Applicant: Novozymes A/S, Bagsvaerd (DK)

(72) Inventors: Irina Victorovna Matveeva, Moscow (RU); Umut Köroglu, Istanbul (TR); Esra Özcömlekci, Istanbul (TR)

(73) Assignee: Novozymes A/S, Bagsvaerd (DK)

( * ) Notice: Subject to any disclaimer, the term of this patent is extended or adjusted under 35 U.S.C. 154(b) by 801 days.

(21) Appl. No.: 17/251,474

(22) PCT Filed: May 29, 2019

(86) PCT No.: PCT/EP2019/063940
§ 371 (c)(1),
(2) Date: Dec. 11, 2020

(87) PCT Pub. No.: WO2019/238423
PCT Pub. Date: Dec. 19, 2019

(65) Prior Publication Data
US 2023/0147687 A1    May 11, 2023

(30) Foreign Application Priority Data

Jun. 12, 2018 (EP) .................................... 18177198
Nov. 22, 2018 (EP) .................................... 18207771

(51) Int. Cl.
*A21D 8/04* (2006.01)
*A21D 13/062* (2017.01)

(52) U.S. Cl.
CPC ........... *A21D 8/042* (2013.01); *A21D 13/062* (2013.01)

(58) Field of Classification Search
CPC ...................................................... A21D 8/042
See application file for complete search history.

(56) References Cited

U.S. PATENT DOCUMENTS

| | | | | |
|---|---|---|---|---|
| 6,521,272 B1 * | 2/2003 | Ando | ..................... | A21D 8/047 426/62 |
| 2013/0209607 A1 * | 8/2013 | Rittig | ..................... | A21D 8/042 426/18 |
| 2016/0135472 A1 | 5/2016 | Bellido et al. | | |

FOREIGN PATENT DOCUMENTS

| | | |
|---|---|---|
| CN | 105208869 A | 12/2015 |
| CN | 106659168 A | 5/2017 |
| EP | 2579727 B1 | 6/2011 |
| WO | 1997041736 A1 | 11/1997 |
| WO | 2011154529 A1 | 12/2011 |
| WO | 2014161876 A1 | 10/2014 |
| WO | 2016005452 A1 | 1/2016 |

OTHER PUBLICATIONS

Shen (Ed), Higher education press, 2004, 235.

\* cited by examiner

*Primary Examiner* — Jenna A Watts
(74) *Attorney, Agent, or Firm* — Yoshimi D. Barron

(57) ABSTRACT

A method of producing a dough with a reduced amount of added sugar comprising adding a raw starch degrading alpha-amylase and a glucoamylase, wherein the raw starch degrading alpha-amylase is a GH13_1 amylase; in particular the raw starch degrading alpha-5 amylase has an amino acid sequence with at least 70% identity to SEQ ID NO:1.

15 Claims, No Drawings
Specification includes a Sequence Listing.

SEQUENCE LISTING

```
<160> NUMBER OF SEQ ID NOS: 1

<210> SEQ ID NO 1
<211> LENGTH: 583
<212> TYPE: PRT
<213> ORGANISM: Artificial sequence
<220> FEATURE:
<223> OTHER INFORMATION: Synthetic construct

<400> SEQUENCE: 1

Ala Thr Ser Asp Asp Trp Lys Gly Lys Ala Ile Tyr Gln Leu Leu Thr
1               5                   10                  15

Asp Arg Phe Gly Arg Ala Asp Asp Ser Thr Ser Asn Cys Ser Asn Leu
            20                  25                  30

Ser Asn Tyr Cys Gly Gly Thr Tyr Glu Gly Ile Thr Lys His Leu Asp
        35                  40                  45

Tyr Ile Ser Gly Met Gly Phe Asp Ala Ile Trp Ile Ser Pro Ile Pro
    50                  55                  60
```

```
Lys Asn Ser Asp Gly Gly Tyr His Gly Tyr Trp Ala Thr Asp Phe Tyr
 65                  70                  75                  80

Gln Leu Asn Ser Asn Phe Gly Asp Glu Ser Gln Leu Lys Ala Leu Ile
                 85                  90                  95

Gln Ala Ala His Glu Arg Asp Met Tyr Val Met Leu Asp Val Val Ala
            100                 105                 110

Asn His Ala Gly Pro Thr Ser Asn Gly Tyr Ser Gly Tyr Thr Phe Asp
        115                 120                 125

Asp Ala Ser Leu Tyr His Pro Lys Cys Thr Ile Asp Tyr Asn Asn Gln
    130                 135                 140

Thr Ser Ile Glu Gln Cys Trp Val Ala Asp Glu Leu Pro Asp Ile Asp
145                 150                 155                 160

Thr Glu Asn Ser Asp Asn Val Ala Ile Leu Asn Asp Ile Val Ser Gly
                165                 170                 175

Trp Val Gly Asn Tyr Ser Phe Asp Gly Ile Arg Ile Asp Thr Val Lys
            180                 185                 190

His Ile Arg Lys Asp Phe Trp Thr Gly Tyr Ala Glu Ala Ala Gly Val
        195                 200                 205

Phe Ala Thr Gly Glu Val Phe Asn Gly Asp Pro Ala Tyr Val Gly Pro
    210                 215                 220

Tyr Gln Lys Tyr Leu Pro Ser Leu Ile Asn Tyr Pro Met Tyr Tyr Ala
225                 230                 235                 240

Leu Asn Asp Val Phe Val Ser Lys Ser Lys Gly Phe Ser Arg Ile Ser
                245                 250                 255

Glu Met Leu Gly Ser Asn Arg Asn Ala Phe Glu Asp Thr Ser Val Leu
            260                 265                 270

Thr Thr Phe Val Asp Asn His Asp Asn Pro Arg Phe Leu Asn Ser Gln
    275                 280                 285

Ser Asp Lys Ala Leu Phe Lys Asn Ala Leu Thr Tyr Val Leu Leu Gly
290                 295                 300

Glu Gly Ile Pro Ile Val Tyr Tyr Gly Ser Glu Gln Gly Phe Ser Gly
305                 310                 315                 320

Gly Ala Asp Pro Ala Asn Arg Glu Val Leu Trp Thr Thr Asn Tyr Asp
                325                 330                 335

Thr Ser Ser Asp Leu Tyr Gln Phe Ile Lys Thr Val Asn Ser Val Arg
            340                 345                 350

Met Lys Ser Asn Lys Ala Val Tyr Met Asp Ile Tyr Val Gly Asp Asn
        355                 360                 365

Ala Tyr Ala Phe Lys His Gly Asp Ala Leu Val Val Leu Asn Asn Tyr
    370                 375                 380

Gly Ser Gly Ser Thr Asn Gln Val Ser Phe Ser Val Ser Gly Lys Phe
385                 390                 395                 400

Asp Ser Gly Ala Ser Leu Met Asp Ile Val Ser Asn Ile Thr Thr Thr
                405                 410                 415

Val Ser Ser Asp Gly Thr Val Thr Phe Asn Leu Lys Asp Gly Leu Pro
            420                 425                 430

Ala Ile Phe Thr Ser Ala Thr Gly Gly Thr Thr Thr Ala Thr Pro
    435                 440                 445

Thr Gly Ser Gly Ser Val Thr Ser Thr Ser Lys Thr Thr Ala Thr Ala
450                 455                 460

Ser Lys Thr Ser Thr Ser Thr Ser Thr Ser Cys Thr Thr Pro Thr
465                 470                 475                 480

Ala Val Ala Val Thr Phe Asp Leu Thr Ala Thr Thr Thr Tyr Gly Glu
```

```
                      485                 490                 495
Asn Ile Tyr Leu Val Gly Ser Ile Ser Gln Leu Gly Asp Trp Glu Thr
            500                 505                 510

Ser Asp Gly Ile Ala Leu Ser Ala Asp Lys Tyr Thr Ser Ser Asp Pro
        515                 520                 525

Leu Trp Tyr Val Thr Val Thr Leu Pro Ala Gly Glu Ser Phe Glu Tyr
        530                 535                 540

Lys Phe Ile Arg Ile Glu Ser Asp Asp Ser Val Glu Trp Glu Ser Asp
545                 550                 555                 560

Pro Asn Arg Glu Tyr Thr Val Pro Gln Ala Cys Gly Thr Ser Thr Ala
                565                 570                 575

Thr Val Thr Asp Thr Trp Arg
            580
```

LESS ADDED SUGAR IN BAKED PRODUCTS

CROSS-REFERENCE TO RELATED APPLICATIONS

This application is a 35 U.S.C. 371 national application of international application no. PCT/EP2019/063940, filed May 29, 2019, and published as WO2019/238423 on Dec. 19, 2019, which claims priority or the benefit under 35 U.S.C. 119 of European application no. 18177198.1, filed Jun. 12, 2018 and European application no. 18207771.9, filed Nov. 22, 2018, the contents of which are fully incorporated herein by reference.

REFERENCE TO SEQUENCE LISTING

This application contains a Sequence Listing in computer readable form, which is incorporated herein by reference. The name of the file containing the Sequence Listing is SQ.txt, which was created on Jul. 8, 2021 and has 5.13 KB.

FIELD OF THE INVENTION

The present invention relates to a method for reducing the amount of recipe sugar in various types of baked products, i.e., less added sugar to the dough, using the combination of an amyloglucosidase and a raw starch degrading alpha-amylase; in particular an amyloglucosidase, an alpha-amylase and a raw starch degrading alpha-amylase.

BACKGROUND OF THE INVENTION

World-wide, baked products (breads, biscuits, etc.) containing sugar are one of the most popular segments in bread assortment. The recipe amount of sugar will typically be 1-25% of total flour weight.

However, due to increased market price for sugar, and shortage in sugar availability in some parts of the world, there is a need for methods for producing baked products that reduce the amount of added sugar to the dough without sacrificing the quality of the baked product.

The present invention relates to recipe sugar reduction in various dough comprising a combination of an amyloglucosidase and a raw starch degrading alpha-amylase; in particular an amyloglucosidase, an alpha-amylase and a raw starch degrading alpha-amylase. The enzyme blend according to the invention is designed to generate simple sugar formation from the starch of the flour during dough fermentation.

SUMMARY OF THE INVENTION

Surprisingly, it has been found that it is possible to partially or wholly dispense the amount of added sugar in a dough so we claim:

A method of producing a dough with a reduced amount of added sugar comprising adding a raw starch degrading alpha-amylase and a glucoamylase to dough ingredients comprising flour, wherein the raw starch degrading alpha-amylase is a GH13_1 amylase.

In one embodiment, the raw starch degrading alpha-amylase has an amino acid sequence with at least 70% identity to SEQ ID NO:1.

In one embodiment, the method additionally comprises an alpha-amylase.

In one embodiment, the raw starch degrading alpha-amylase is added in an amount of 0.01-10 mg enzyme protein per kg flour.

In one embodiment, the glucoamylase is added in an amount of 1-1000 mg enzyme protein per kg flour.

In one embodiment, the alpha-amylase is added in an amount of 0.1-100 mg enzyme protein per kg flour.

In one embodiment, the amount of added sugar is reduced by at least 10% (w/w) compared to the amount of sugar added to a dough in an original recipe, wherein no glucoamylase or raw starch degrading alpha-amylase is added to the dough.

In one embodiment, one or more additional enzymes selected from the group consisting of maltogenic amylase, beta amylase, aminopeptidase, carboxypeptidase, catalase, cellulytic enzyme, chitinase, cutinase, cyclodextrin glycosyltransferase, deoxyribonuclease, esterase, glucan 1,4-alpha-maltotetrahydrolase, glucanase, galactanase, alpha-galactosidase, beta-galactosidase, glucose oxidase, alpha-glucosidase, beta-glucosidase, haloperoxidase, hemicellulytic enzyme, invertase, laccase, lipase, mannanase, mannosidase, oxidase, pectinolytic enzymes, peptidoglutaminase, peroxidase, phospholipase, phytase, polyphenoloxidase, proteolytic enzyme, ribonuclease, transglutaminase, and xylanase, are added to the dough.

In one embodiment, the additional dough ingredients comprise yeast, water, sugar and salt.

In one embodiment, the additional dough ingredients comprise fat and/or oil and/or shortenings.

In one embodiment, we claim a baked product obtainable by the method according to the invention.

In one embodiment, we claim a baking composition comprising a raw starch degrading alpha-amylase, a glucoamylase, and flour, wherein the raw starch degrading alpha-amylase is a GH13_1 amylase.

In one embodiment, the baking composition comprises a raw starch degrading alpha-amylase having an amino acid sequence with at least 70% identity to SEQ ID NO:1.

In one embodiment, the baking composition additionally comprises an alpha-amylase.

In one embodiment, we claim the use of a baking composition comprising a raw starch degrading alpha-amylase and a glucoamylase for sugar replacement (i.e. less added sugar), wherein the raw starch degrading alpha-amylase is a GH13_1 amylase; in particular the raw starch degrading alpha-amylase has an amino acid sequence with at least 70% identity to SEQ ID NO:1.

In one embodiment, we claim the use of a baking composition comprising a raw starch degrading alpha-amylase, a glucoamylase and an alpha-amylase for sugar replacement (i.e. less added sugar), wherein the raw starch degrading alpha-amylase is a GH13_1 amylase; in particular the raw starch degrading alpha-amylase has an amino acid sequence with at least 70% identity to SEQ ID NO:1.

In one embodiment, we claim the use of a baking composition comprising a raw starch degrading alpha-amylase, a glucoamylase, an alpha-amylase, and flour for sugar replacement (i.e. less added sugar), wherein the raw starch degrading alpha-amylase is a GH13_1 amylase; in particular the raw starch degrading alpha-amylase has an amino acid sequence with at least 70% identity to SEQ ID NO:1.

In one embodiment, we claim the use of a baking composition comprising a raw starch degrading alpha-amylase and a glucoamylase for increased sweetness and/or less added sugar, wherein the raw starch degrading alpha-amylase is a GH13_1 amylase; in particular the raw starch degrading alpha-amylase has an amino acid sequence with at least 70% identity to SEQ ID NO:1. Additionally, the baking composition may comprise an alpha-amylase.

In one embodiment, we claim the use of a baking composition comprising a raw starch degrading alpha-amylase and a glucoamylase for increased volume of the baked product, wherein the raw starch degrading alpha-amylase is a GH13_1 amylase; in particular the raw starch degrading alpha-amylase has an amino acid sequence with at least 70% identity to SEQ ID NO:1. Additionally, the baking composition may comprise an alpha-amylase.

In one embodiment, we claim the use of a baking composition comprising a raw starch degrading alpha-amylase and a glucoamylase for crumb sweetness, wherein the raw starch degrading alpha-amylase is a GH13_1 amylase; in particular the raw starch degrading alpha-amylase has an amino acid sequence with at least 70% identity to SEQ ID NO:1. Additionally, the baking composition may comprise an alpha-amylase.

DETAILED DESCRIPTION OF THE INVENTION

Definitions

Sequence identity: The relatedness between two amino acid sequences or between two nucleotide sequences is described by the parameter "sequence identity".

For purposes of the present invention, the sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, Trends Genet. 16: 276-277), preferably version 5.0.0 or later. The parameters used are gap open penalty of 10, gap extension penalty of 0.5, and the EBLOSUM62 (EMBOSS version of BLOSUM62) substitution matrix. The output of Needle labelled "longest identity" (obtained using the -no brief option) is used as the percent identity and is calculated as follows:

(Identical Residues×100)/(Length of Alignment−
Total Number of Gaps in Alignment)

Variant: The term "variant" means a polypeptide comprising an alteration, i.e., a substitution, insertion, and/or deletion, at one or more (e.g., several) positions. A substitution means replacement of the amino acid occupying a position with a different amino acid; a deletion means removal of the amino acid occupying a position; and an insertion means adding one or more amino acids adjacent to and immediately following the amino acid occupying a position.

Increased strength: The term "increased strength of the dough" is defined herein as the property of a dough that has generally more elastic properties and/or requires more work input to mould and shape compared to a control.

Increased elasticity: The term "increased elasticity of the dough" is defined herein as the property of a dough which has a higher tendency to regain its original shape after being subjected to a certain physical strain compared to a control.

Increased stability of the dough: The term "increased stability of the dough" is defined herein as the property of a dough that is less susceptible to mechanical abuse thus better maintaining its shape and volume and is evaluated by the ratio of height:width of a cross section of a loaf after normal and/or extended proof compared to a control.

Reduced stickiness of the dough: The term "reduced stickiness of the dough" is defined herein as the property of a dough that has less tendency to adhere to surfaces compared to a control, e.g., in the dough production machinery, and it is either evaluated empirically by the skilled test baker or measured by, e.g., a texture analyser (e.g. TAXT2) as known in the art.

Improved extensibility: The term "improved extensibility of the dough" is defined herein as the property of a dough that can be subjected to increased strain or stretching without rupture compared to a control.

Improved machine ability: The term "improved machine ability of the dough" is defined herein as the property of a dough that is generally less sticky and/or firmer and/or more elastic compared to a control.

Increased volume of the baked product: The term "increased volume of the baked product" is measured as the volume of a given loaf of bread compared to a control. The volume may be determined as known in the art.

Improved crumb structure of the baked product: The term "improved crumb structure of the baked product" is defined herein as the property of a baked product with finer cells and/or thinner cell walls in the crumb and/or more uniform/homogenous distribution of cells in the crumb compared to a control and is usually evaluated visually by the skilled baker or by digital image analysis as known in the art (e.g., C-cell, Calibre Control International Ltd, Appleton, Warrington, UK).

Improved softness of the baked product: The term "improved softness of the baked product" is the opposite of "firmness" and is defined herein as the property of a baked product that is more easily compressed compared to a control and is evaluated either empirically by the skilled test baker or measured by, e.g., a texture analyser (e.g. TAXT2 or TA-XT Plus from Stable Micro Systems Ltd, surrey, UK) as known in the art.

Sensory attributes of the baked products: The sensory attributes may be evaluated using procedures well established in the baking industry, and may include, for example, the use of a panel of trained taste-testers.

First bite: The 'first bite' test may be done in the following way: Fold a slice of bread once and take a bite. Evaluate the force needed to make the first bite. The control sample is given 5. A higher force indicates firm bread and is given a lower rating. A low force indicates soft bread and is given a higher rating.

HunterLab, colour measurement of the crust: HunterLab is a Colorimetric Spectrophotometric method using a light source to illuminate the sample, measuring the amount of light at different wavelengths. The light reflected by the sample passes to a grating which breaks it into its spectral components. Hunter L (lightness) axis: 0 is black and 100 is white. A lower L-value indicates darker colour.

The Dough

As used herein "dough" means any dough used to prepare a baked product, in particular a bread.

According to the present invention, the dough used to prepare a baked product may be made from any suitable dough ingredients comprising flour.

The flour may be from any baking grain known in the art, such as, wheat flour, corn flour, rye flour, barley flour, oat flour, rice flour, sorghum flour, potato flour, soy flour, and any combinations thereof (e.g., wheat flour combined with one of the other flour sources; or rice flour combined with one of the other flour sources).

In a preferred embodiment, the flour is wheat flour.

In a preferred embodiment, at least 10% (w/w) or more of the total flour content is wheat flour, e.g., at least 15% or more of the total flour content is wheat flour, e.g., at least 20% or more of the total flour content is wheat flour, e.g., at least 25% or more of the total flour content is wheat flour, e.g., at least 30% or more of the total flour content is wheat flour, e.g., at least 35% or more of the total flour content is wheat flour, e.g., at least 40% or more of the total flour content is wheat flour, e.g., at least 45% or more of the total flour content is wheat flour, e.g., at least 50% or more of the total flour content is wheat flour, e.g., at least 55% or more of the total flour content is wheat flour, e.g., at least 60% or more of the total flour content is wheat flour, e.g., at least 65% or more of the total flour content is wheat flour, e.g., at least 70% or more of the total flour content is wheat flour, e.g., at least 75% or more of the total flour content is wheat flour, e.g., at least 80% or more of the total flour content is wheat flour, e.g., at least 85% or more of the total flour content is wheat flour, e.g., at least 90% or more of the total flour content is wheat flour, e.g., at least 95% or more of the total flour content is wheat flour, e.g., 100% of total the flour is wheat flour.

The dough of the invention is normally a leavened dough or a dough to be subjected to leavening. The dough may be leavened in various ways, such as by adding dough ingredients such as chemical leavening agents, e.g., sodium bicarbonate or by adding a leaven (fermenting dough), but it is preferred to leaven the dough by adding a suitable yeast culture, such as a culture of *Saccharomyces cerevisiae* (baker's yeast), e.g., a commercially available strain of *S. cerevisiae*.

The dough of the invention may typically comprise some added sugar as the method according to the invention is able to reduce the amount of added sugar, but normally a partially reduction of sugar is obtained.

In one embodiment, the amount of added sugar is reduced by at least 10% (w/w) compared to the amount of sugar added to a dough in an original recipe, e.g., the amount of added sugar is reduced by at least 20% (w/w) compared to the amount of sugar added to a dough in an original recipe, e.g., the amount of added sugar is reduced by at least 30% (w/w) compared to the amount of sugar added to a dough in an original recipe, e.g., the amount of added sugar is reduced by at least 40% (w/w) compared to the amount of sugar added to a dough in an original recipe, e.g., the amount of added sugar is reduced by at least 50% (w/w) compared to the amount of sugar added to a dough in an original recipe, e.g., the amount of added sugar is reduced by at least 60% (w/w) compared to the amount of sugar added to a dough in an original recipe, e.g., the amount of added sugar is reduced by at least 70% (w/w) compared to the amount of sugar added to a dough in an original recipe, e.g., the amount of added sugar is reduced by at least 80% (w/w) compared to the amount of sugar added to a dough in an original recipe, e.g., the amount of added sugar is reduced by at least 90% (w/w) compared to the amount of sugar added to a dough in an original recipe, e.g., the amount of added sugar is reduced by 100% (w/w) compared to the amount of sugar added to a dough in an original recipe.

The dough may also comprise other conventional dough ingredients, e.g., proteins, such as milk powder, gluten, and soy; eggs (either whole eggs, egg yolks or egg whites); an oxidant such as ascorbic acid, potassium bromate, potassium iodate, azodicarbonamide (ADA) or ammonium persulfate; an amino acid such as L-cysteine; a salt such as sodium chloride, calcium acetate, sodium sulphate, calcium sulphate, diluents such as silica dioxide, and starch of different origins. Still other conventional ingredients include hydrocolloids such as CMC, guar gum, xanthan gum, locust bean gum, etc.

The dough ingredients may typically comprise fat (triglyceride) and/or oil and/or shortenings, in particular oil such as sunflower oil or rapeseed oil.

The dough may be prepared applying any conventional mixing process, such as the continuous mix process, straight-dough process, or the sponge and dough method.

The present invention is particularly useful for preparing dough and baked products in industrialized processes in which the dough used to prepare the baked products are prepared mechanically using automated or semi-automated equipment.

The process of preparing bread generally involves the sequential steps of dough making, sheeting or dividing, shaping or rolling, and proofing the dough, which steps are well known in the art.

As used herein, "baked product" means any kind of baked product including bread types such as pan bread, toast bread, open bread, pan bread with and without lid, buns, Fino bread, Hammam bread, Samoli bread, baguettes, hamburger buns, rolls, brown bread, whole meal bread, rich bread, bran bread, flat bread, biscuits, and any variety thereof. According to the present invention, the baked product may also be a cake or any patisserie product as known in the art.

Enzymes

The present invention is directed to methods and compositions for preparing dough by applying specific enzymes to a dough. The enzyme combination comprises at least a raw starch degrading alpha-amylase and a glucoamylase, wherein the raw starch degrading alpha-amylase is a GH13_1 amylase, e.g., the raw starch degrading alpha-amylase has an amino acid sequence having at least 70% identity to SEQ ID NO:1.

In one embodiment, the enzyme combination comprises at least a raw starch degrading alpha-amylase, a glucoamylase and an alpha-amylase, wherein the raw starch degrading alpha-amylase is a GH13_1 amylase, e.g., the raw starch degrading alpha-amylase has an amino acid sequence having at least 70% identity to SEQ ID NO:1.

Raw Starch Degrading Alpha-Amylase

As used herein, a "raw starch degrading alpha-amylase" refers to an enzyme that can directly degrade raw starch granules below the gelatinization temperature of starch.

Examples of raw starch degrading alpha-amylases include the ones disclosed in WO 2005/003311, U.S. Patent Publication no. 2005/0054071, and U.S. Pat. No. 7,326,548. Examples also include those enzymes disclosed in Table 1 to 5 of the examples in U.S. Pat. No. 7,326,548, in U.S. Patent Publication no. 2005/0054071 (Table 3 on page 15), as well as the enzymes disclosed in WO 2004/020499 and WO 2006/06929 and WO 2006/066579.

In one embodiment, the raw starch degrading alpha-amylase is a GH13_1 amylase.

In one embodiment, the raw starch degrading alpha-amylase is an enzyme having the amino acid sequence shown in SEQ ID NO:1:

```
ATSDDWKGKA IYQLLTDRFG RADDSTSNCS NLSNYCGGTY
EGITKHLDYI SGMGFDAIWI SPIPKNSDGG YHGYWATDFY
```

```
-continued
QLNSNFGDES QLKALIQAAH ERDMYVMLDV VANHAGPTSN

GYSGYTFDDA SLYHPKCTID YNNQTSIEQC WVADELPDID

TENSDNVAIL NDIVSGWVGN YSFDGIRIDT VKHIRKDFWT

GYAEAAGVFA TGEVFNGDPA YVGPYQKYLP SLINYPMYYA

LNDVFVSKSK GFSRISEMLG SNRNAFEDTS VLTTFVDNHD

NPRFLNSQSD KALFKNALTY VLLGEGIPIV YYGSEQGFSG

GADPANREVL WTTNYDTSSD LYQFIKTVNS VRMKSNKAVY

MDIYVGDNAY AFKHGDALVV LNNYGSGSTN QVSFSVSGKF

DSGASLMDIV SNITTTVSSD GTVTFNLKDG LPAIFTSATG

GTTTTATPTG SGSVTSTSKT TATASKTSTS TSSTSCTTPT

AVAVTFDLTA TTTYGENIYL VGSISQLGDW ETSDGIALSA

DKYTSSDPLW YVTVTLPAGE SFEYKFIRIE SDDSVEWESD

PNREYTVPQA CGTSTATVTD TWR

SEQ ID NO: 1 belongs to the GH13_1 amylases.
```

In one embodiment, the raw starch degrading alpha-amylase enzyme has at least 70%, e.g. at least 71%, e.g. at least 72%, e.g. at least 73%, e.g. at least 74%, e.g. at least 75%, e.g. at least 76%, e.g. at least 77%, e.g. at least 78%, e.g. at least 79%, e.g., at least 80%, e.g. at least 81%, e.g. at least 82%, e.g. at least 83%, e.g. at least 84%, e.g., at least 85%, e.g. at least 86%, e.g. at least 87%, e.g. at least 88%, e.g. at least 89%, e.g., at least 90%, e.g., at least 91%, e.g., at least 92%, e.g., at least 93%, e.g., at least 94%, e.g., at least 95%, e.g. at least 96%, e.g., at least 97%, e.g., at least 98%, e.g., at least 99% identity to the raw starch degrading alpha-amylase shown as SEQ ID NO:1 herein.

In one embodiment, the raw starch degrading alpha-amylase enzyme is SEQ ID NO:1.

The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function, such as a poly-histidine tract, an antigenic epitope, or a binding domain.

Examples of conservative substitutions are within the groups of basic amino acids (arginine, lysine and histidine), acidic amino acids (glutamic acid and aspartic acid), polar amino acids (glutamine and asparagine), hydrophobic amino acids (leucine, isoleucine and valine), aromatic amino acids (phenylalanine, tryptophan and tyrosine), and small amino acids (glycine, alanine, serine, threonine and methionine). Amino acid substitutions that do not generally alter specific activity are known in the art and are described, for example, by H. Neurath and R. L. Hill, 1979, In, *The Proteins*, Academic Press, New York. Common substitutions are Ala/Ser, Val/Ile, Asp/Glu, Thr/Ser, Ala/Gly, Ala/Thr, Ser/Asn, Ala/Val, Ser/Gly, Tyr/Phe, Ala/Pro, Lys/Arg, Asp/Asn, Leu/Ile, Leu/Val, Ala/Glu, and Asp/Gly.

In one embodiment, the raw starch degrading alpha-amylase according to the invention may be added to flour or dough in an amount of 0.01-10 mg enzyme protein per kg flour, e.g., in an amount of 0.1-5 mg enzyme protein per kg flour.

Glucoamylases

Glucoamylases are also called amyloglucosidases, and Glucan 1,4-alpha-glucosidase (EC 3.2.1.3).

According to the present invention, different types of amyloglucosidases may be used, e.g, the amyloglucosidase may be a polypeptide that is encoded by a DNA sequence that is found in a fungal strain of *Aspergillus, Rhizopusor, Talaromyces* or *Penicillium*.

Examples of suitable fungi include *Aspergillus niger, Aspergillus awamori, Aspergillus oryzae, Rhizopus delemar, Rhizopus niveus, Rhizopus oryzae, Penicillium oxysporum* and *Talaromyces emersonii*.

The glucoamylase for use in the present invention include the *A. niger* G1 or G2 glucoamylase (Boel et al. (1984), EMBO J. 3 (5), p. 1097-1102), the *A. awamori* glucoamylase disclosed in WO 84/02921, or the *A. oryzae* glucoamylase (Agric. Biol. Chem. (1991), 55 (4), p. 941-949). A suitable commercial glucoamylase is GoldCrust® obtainable from Novozymes A/S.

In one embodiment, the glucoamylase according to the invention may be added to flour or dough in an amount of 1-1000 mg enzyme protein per kg flour, e.g., in an amount of 50-500 mg enzyme protein per kg flour.

Amylases

Alpha-Amylases (alpha-1,4-glucan-4-glucanohydrolases, EC. 3.2.1.1) constitute a group of enzymes which catalyze hydrolysis of starch and other linear and branched 1,4-glucosidic oligo- and polysaccharides.

A number of alpha-amylases are referred to as Termamyl™ and "Termamyl™-like alpha-amylases" and are known from, e.g., WO 90/11352, WO 95/10603, WO 95/26397, WO 96/23873 and WO 96/23874.

Another group of alpha-amylases are referred to as Fungamyl™ and "Fungamyl™-like alpha-amylases", which are alpha-amylases related to the alpha-amylase derived from *Aspergillus oryzae* disclosed in WO 01/34784.

Suitable commercial alpha-amylase compositions according to the present invention include, e.g., BAKEZYME P 300 (available from DSM) and FUNGAMYL 2500 SG, FUNGAMYL 4000 BG, FUNGAMYL 4000 SG, FUNGAMYL 800 L, FUNGAMYL ULTRA BG and FUNGAMYL ULTRA SG (available from Novozymes A/S).

In one embodiment, the alpha-amylase according to the invention may be added to flour or dough in an amount of 0.1-100 mg enzyme protein per kg flour, e.g., in an amount of 0.5-20 mg enzyme protein per kg flour.

Additional Enzymes

Optionally, one or more additional enzymes, such as maltogenic amylase, beta amylase, aminopeptidase, carboxypeptidase, catalase, cellulytic enzyme, chitinase, cutinase, cyclodextrin glycosyltransferase, deoxyribonuclease, esterase, glucan 1,4-alpha-maltotetrahydrolase, glucanase, galactanase, alpha-galactosidase, beta-galactosidase, glucose oxidase, alpha-glucosidase, beta-glucosidase, haloperoxidase, hemicellulytic enzyme, invertase, laccase, lipase, mannanase, mannosidase, oxidase, pectinolytic enzymes, peptidoglutaminase, peroxidase, phospholipase, phytase, polyphenoloxidase, proteolytic enzyme, ribonuclease, transglutaminase, and xylanase may be used together with the enzyme composition according to the invention.

The additional enzyme(s) may be of any origin, including mammalian, plant, and microbial (bacterial, yeast or fungal) origin.

The maltogenic alpha-amylase (EC 3.2.1.133) may be from *Bacillus*. A maltogenic alpha-amylase from *B. stearothermophilus* strain NCIB 11837 is commercially available from Novozymes A/S under the tradename Novamyl®.

The maltogenic alpha-amylase may also be a variant of the maltogenic alpha-amylase from *B. stearothermophilus* as disclosed in, e.g., WO1999/043794; WO2006/032281; or WO2008/148845, e.g., Novamyl® 3D.

An anti-staling amylase for use in the invention may also be an amylase (glucan 1,4-alpha-maltotetrahydrolase (EC 3.2.1.60)) from *Pseudomonas* saccharophilia or variants thereof, such as any of the amylases disclosed in WO1999/050399, WO2004/111217 or WO2005/003339.

The glucose oxidase may be a fungal glucose oxidase, in particular an *Aspergillus niger* glucose oxidase (such as GLUZYME®, available from Novozymes A/S).

The xylanase which may be of microbial origin, e.g., derived from a bacterium or fungus, such as a strain of *Aspergillus*, in particular of *A. aculeatus, A. niger, A. awamori*, or *A. tubigensis*, from a strain of *Trichoderma*, e.g. *T. reesei*, or from a strain of *Humicola*, e.g., *H. insolens*.

Suitable commercially available xylanase preparations for use in the present invention include PANZEA BG, PENTOPAN MONO BG and PENTOPAN 500 BG (available from Novozymes A/S), GRINDAMYL POWERBAKE (available from Danisco), and BAKEZYME BXP 5000 and BAKEZYME BXP 5001 (available from DSM).

The protease may be from *Bacillus*, e.g., *B. amyloliquefaciens*. A suitable protease may be Neutrase® available from Novozymes A/S.

The phospholipase may have phospholipase A1, A2, B, C, D or lysophospholipase activity; it may or may not have lipase activity. It may be of animal origin, e.g. from pancreas, snake venom or bee venom, or it may be of microbial origin, e.g., from filamentous fungi, yeast or bacteria, such as *Aspergillus* or *Fusarium*, e.g., *A. niger, A. oryzae* or *F. oxysporum*. A preferred lipase/phospholipase from *Fusarium oxysporum* is disclosed in WO 98/26057. Also, the variants described in WO 00/32758 may be used.

Suitable phospholipase compositions are LIPOPAN F, LIPOPAN XTRA, and LIPOPAN MAX (available from Novozymes A/S) or PANAMORE GOLDEN and PANAMORE SPRING (available from DSM).

Enzyme Compositions

The raw starch degrading alpha-amylase and the glucoamylase may be added to flour or dough in any suitable form, such as, e.g., in the form of a liquid, in particular a stabilized liquid, or it may be added to flour or dough as a substantially dry powder or granulate.

The raw starch degrading alpha-amylase, the glucoamylase and the alpha-amylase may be added to flour or dough in any suitable form, such as, e.g., in the form of a liquid, in particular a stabilized liquid, or it may be added to flour or dough as a substantially dry powder or granulate.

Granulates may be produced, e.g., as disclosed in U.S. Pat. Nos. 4,106,991 and 4,661,452. Liquid enzyme preparations may, for instance, be stabilized by adding a sugar or sugar alcohol or lactic acid according to established procedures. Other enzyme stabilizers are well-known in the art.

The enzyme combination may be added to the bread dough ingredients in any suitable manner, such as individual components (separate or sequential addition of the enzymes) or addition of the enzymes together in one step or one composition.

Baking Composition

The present invention further relates to a baking composition comprising flour together with a raw starch degrading alpha-amylase and a glucoamylase.

The present invention further relates to a baking composition comprising flour together with a raw starch degrading alpha-amylase, a glucoamylase, and an alpha-amylase.

The baking composition may contain other dough-improving and/or bread-improving additives, e.g., any of the additives, including enzymes, mentioned above.

The baking composition may be, e.g., a dough composition, a flour composition, a flour pre-mix, or a bread improver.

It will often be advantageous to provide the enzymes used in the treatment of the present invention in admixture with other ingredients used to improve the properties of baked products. These baking compositions are commonly known in the art as "pre-mixes," which usually comprise flour.

Hence, in a further aspect, the present invention relates to a bread premix for improving the quality of dough by reducing the amount of added sugar, which premix comprises the enzyme combination of the present invention.

In one embodiment, the present invention further relates to a bread pre-mix comprising the enzyme combination of the present invention and flour, such as, flour from grains, such as, wheat flour, corn flour, rye flour, barley flour, oat flour, rice flour, or sorghum flour, and combinations thereof.

In another embodiment, the present invention relates to a bread pre-mix comprising the enzyme combination of the present invention and flour, such as, flour from grains, such as, wheat flour, corn flour, rye flour, barley flour, oat flour, rice flour, sorghum, soy flour, and combinations thereof, and one or more additional enzymes, as previously described.

The pre-mix may be in the form of a granulate or agglomerated powder, e.g., wherein typically 95% (by weight) of the granulate or agglomerated powder has a particle size between 25 and 500 µm.

Granulates and agglomerated powders may be prepared by conventional methods, e.g., by spraying the enzymes onto a carrier in a fluid-bed granulator. The carrier may consist of particulate cores having a suitable particle size. The carrier may be soluble or insoluble, e.g. a salt (such as NaCl or sodium sulfate), a sugar (such as sucrose or lactose), a sugar alcohol (such as sorbitol), starch, rice, corn grits, or soy.

Bread Properties

Organoleptic qualities or sensory attributes of the bread may be measured as known in the art. The properties of the bread may be referred to herein as sensory attributes, which include anti-staling (bread crumb firmness/hardness), crumb properties and mouth feel, or more precisely, the attributes of bread as detected in the mouth during eating (e.g., bread softness/resistance to first bite, crumb moistness, crumb chewiness and gumminess, and crumb smoothness and melting properties).

In one embodiment, the sensory attribute of the baked product is an increased sweetness by using the enzyme solution according to the invention.

In one embodiment, the sensory attribute of the baked product is an increased crumb sweetness by using the enzyme solution according to the invention.

The invention described and claimed herein is not to be limited in scope by the specific embodiments herein disclosed, since these embodiments are intended as illustrations of several aspects of the invention. Any equivalent embodiments are intended to be within the scope of this invention as well as combinations of one or more of the embodiments.

Various references are cited herein, the disclosures of which are incorporated by reference in their entireties. The present invention is further described by the following example which should not be construed as limiting the scope of the invention.

Example 1

Fino Breads

Fino breads (Free standing pan bread, open top) were made in the following way:

Recipe, % (w/w):

Wheat Flour—100

Sugar—10

Salt—0.50

Dry yeast—1

Sunflower oil—2

Water—55-64

TABLE 0

Baking procedure:

| Procedure | Time, min |
|---|---|
| Mixing at speed low/high speed (80 min$^{-1}$/150 min$^{-1}$) | 4/4 |
| Temperature after mixing, ° C. | 27-28 |
| Table resting, min | 10 |
| Scaling 40 g × 10 pieces | 5 |
| Length (20-25 cm) | |
| Fermentation time at 36° C., min | 60 |
| Baking at temperature 220-240° C. | 6 |

The Fino breads according to the invention were made with only 5% sugar instead of 10% sugar and with the addition of the enzymes:

0.4 mg raw starch degrading alpha-amylase (SEQ ID NO:1) protein per kg flour 124 mg glucoamylase protein (Gold Crust™) per kg flour 4.0 mg amylase protein (Fungamyl™) per kg flour The following results were obtained:

TABLE 1

Sensory attributes, 1 and 5 days after baking

| Sensory attributes | 10% sugar | 5% sugar |
|---|---|---|
| Sensory evaluation of day: 1 | | |
| First bite/softness: | 5 | 5 |
| Bread chewiness: | 5 | 5 |
| Sweetness: | 5 | 5 |
| Sensory evaluation of day: 5 | | |
| First bite/softness: | 5 | 5 |
| Bread chewiness: | 5 | 5 |
| Sweetness: | 5 | 4 |

The data shown in Table 1 demonstrate that the sensorial eating characteristics of the Fino bread evaluated 1 and 5 days after baking were almost the same; however, the loss of 1 score point of sweetness for bread (after 5 days) with the solution according to the invention was observed. This reduction in 1 score point can be considered as an insignificant impact when looking at the eating properties as a whole.

With a fermentation time of 60 minutes, the breads had a volume increase of 7%.

The L-values indicating the extent of crust coloration of Fino bread with 10% sugar and 5% sugar plus enzyme solution according to the invention were similar: 46.8 (10% sugar) and 47.3 (5% sugar+enzyme solution according to the invention).

It can be concluded that the method according to the invention gave an intensive crust coloration; a stable bread quality; a good volume; a well-developed crumb structure; and a reduction of almost half the amount from recipe's sugar amount.

Example 2

Hamburger Buns

Hamburger buns were made as known in the art using the following recipe:

TABLE 2

Hamburger bun recipe, % (w/w):

| Ingredients: | 12% sugar (Control) | 6% sugar plus the enzymes according to the invention |
|---|---|---|
| Wheat flour type 550 | 100 | 100 |
| Fresh yeast % | 3 | 2.5 |
| Salt % | 1.3 | 1.3 |
| Sunflower oil % | 3.5 | 3.5 |
| Sugar % | 12 | 6 |
| Water % | 55 | 57 |
| Enzymes according to the invention | 0 | 0.4 mg raw starch degrading alpha-amylase (SEQ ID NO: 1) protein per kg flour; and 131 mg glucoamylase protein (Gold crust ™) per kg flour |
| Fungamyl ® 4000 SG ppm | 10 | 10 |
| Panzea ® BG ppm | 30 | 30 |
| Lipopan ® Max BG ppm | 7 | 7 |
| Novamyl ® 3D ppm | 30 | 30 |

TABLE 2-continued

Hamburger bun recipe, % (w/w):

| Ingredients: | 12% sugar (Control) | 6% sugar plus the enzymes according to the invention |
|---|---|---|
| Ascorbic acid ppm | 60 | 60 |
| DATEM % | 0.2 | 0.2 |
| Ca propionate % | 0.3 | 0.2 |

The hamburger buns had a fermentation time of 90 min; where after they were baked in the oven at 220° C. for 15 min Results:

Replacing 12% added sugar with 6% added sugar and the enzymes according to the present invention gave the hamburger buns better sensorial characteristics.

A blind sensory test revealed high scores for appearances, crust color, first bite, and softness. The results for the recipe with reduced added sugar and the enzymes according to the invention were higher by 1.3 (appearances), 2.1 (crust color), 0.7 (first bite) and 0.9 (softness) than the control with full added sugar content.

The sweetness of the control, which contained 12% added sugar, was 5.8.

The sweetness of the buns with 6% added sugar and the enzymes according to the invention was 5.3.

Example 3

Moroccan Baguettes

Moroccan baguettes were made as known in the art using the following recipe:

TABLE 3

Moroccan baguettes recipe, % (w/w):

| Ingredients | 3% added sugar | No sugar. Enzymes according to the invention |
|---|---|---|
| Wheat flour % | 100 | 100 |
| Fresh yeast % | 2.5 | 2.5 |
| Salt % | 1.5 | 1.5 |
| Sugar % | 3 | 0 |
| Water % | 55 | 55 |
| Enzymes according to the invention* | 0 | 0.25 mg raw starch degrading alpha-amylase (SEQ ID NO: 1) protein per kg flour; and 83 mg glucoamylase protein (Gold crust ™) per kg flour |
| Fungamyl 4000 SG ppm | 7 | 7 |
| Panzea BG ppm | 25 | 25 |
| Ascorbic acid ppm | 40 | 40 |

The Moroccan baguettes had a fermentation time of 120 min; whereafter they were baked in the oven at 220° C. for 18 min.

Results:

The addition of the enzymes according to the invention to Moroccan baguettes with no added sugar lead to baguettes with attractive appearance, nice crust coloration, good volume, and a well-expressed bloom when compared to baguettes with 3% added sugar.

The volume of the baguettes without added sugar had a volume increase of 3% compared to the baguettes that contain 3% added sugar.

The L-value, indicating the extent of crust coloration, showed that the addition of enzymes according to the invention gave an L-value of 63.6 whereas the L-value for the baguette with 3% added sugar had an L-value of 64.2.

The sensory evaluation of the baguettes showed surprisingly that the sweetness was the same for baguettes with 3% added sugar as for baguettes with no added sugar but with the addition of the enzymes according to the invention. This means that the enzymes according to the invention can fully replace 3% added sugar.

Example 4

Toast Bread (Panned Bread, Open Top)—1.5% Sucrose Added to all Dough

TABLE 4

Recipe, % (w/w):

| Ingredients: | |
|---|---|
| Wheat flour, Kolibri % | 100 |
| Fresh yeast % | 4 |
| Salt % | 0.5 |
| Sucrose % | 1.5 |
| Water % | 58 |
| Enzyme solution | * |
| Fungamyl ® 4000 SG ppm | 7 |
| Panzea ® BG ppm | 25 |
| Ascorbic acid ppm | 40 |

*): Enzyme solution:
Control (= no starch degrading enzyme and no glucoamylase)

Enzyme Solution A:
  0.23 mg raw starch degrading alpha-amylase (SEQ ID NO:1) protein per kg flour, and
  75 mg glucoamylase protein (Gold Crust™) per kg flour Enzyme Solution B:
  0.35 mg raw starch degrading alpha-amylase (SEQ ID NO:1) protein per kg flour, and
  113 mg glucoamylase protein (Gold Crust™) per kg flour

TABLE 5

Baking procedure:

| Procedure | Time, min |
|---|---|
| Mixing at speed low/high speed (17 rpm/35 rpm) | 3/7 |
| Temperature after mixing, ° C. | 26.6-26.9 |
| Floor time | 20 |
| Scaling 320 g × 8 bread 1200 mL pans | 10 |
| Table resting/bench time | 15 |
| Fermentation time at 32° C., min | 55 |
| Baking at temperature 230° C. | 30 |

Sensory Evaluation Method:

Each assessor was served ½ slice of bread without crust (day 1). Samples were served blind, 3-digits coded, and in random order. 6 trained assessors participated in the evaluation. 'Crumb sweetness' was evaluated on 1-9 point intensity scale ranging from little to very intense. Two sensory replicates were performed.

Results:

TABLE 6

Sensory 'Crumb sweetness', 1 day after baking

| Enzyme solution | Mean |
|---|---|
| B | 4.8 |
| A | 3.7 |
| Control | 1.7 |

The data shown in Table 6 clearly demonstrate that bread with enzyme solution B was sweeter than bread with enzyme solution A which was sweeter than Control.

In addition, the bread with enzyme solution A resulted in 1% volume increase, and the bread with enzyme solution B resulted in 3% volume increase.

Example 5

Toast Bread (Panned Bread, Open Top), No Sucrose Added to Dough

TABLE 7

| Ingredients: | % (w/w) |
|---|---|
| Wheat flour, Kolibri % | 100 |
| Fresh yeast % | 4 |
| Salt % | 1.5 |
| Water % | 59.5 |
| Enzyme solution | ** |
| Fungamyl ® 4000 SG ppm | 10 |
| Panzea ® BG ppm | 30 |
| Ascorbic acid ppm | 60 |

**): Enzyme solution:
Control (= no starch degrading enzyme and no glucoamylase)

Enzyme Solution A:
  0.23 mg raw starch degrading alpha-amylase (SEQ ID NO:1) protein per kg flour, and
  75 mg glucoamylase protein (Gold Crust™) per kg flour
Enzyme Solution C:
  0.46 mg raw starch degrading alpha-amylase (SEQ ID NO:1) protein per kg flour, and
  150 mg glucoamylase protein (Gold Crust™) per kg flour

TABLE 8

Baking procedure:

| Procedure | Time, min |
|---|---|
| Mixing at speed low/high speed (17 rpm/35 rpm) | 3/7 |
| Temperature after mixing, ° C. | 26.0 |
| Floor time | 20 |
| Scaling 320 g × 8 bread 1200 mL pans | 10 |
| Table resting/bench time | 15 |
| Fermentation time at 32° C., min | 55 |
| Baking at temperature 230° C. | 30 |

The sensory evaluation method was made in the same way as in Example 4, but in addition to 'Crumb sweetness', 'Dark crust' colour of the crust was also evaluated.

Results:

TABLE 9

Sensory attributes of bread, day 1 after baking

| | Control | Enzyme solution A | Enzyme solution C |
|---|---|---|---|
| Dark crust | 3.0 | 5.5 | 7.4 |
| Crumb sweetness | 2.4 | 2.5 | 3.4 |

The sensory data showed that that the enzyme solution caused higher intensities of 'Dark crust', and 'Crumb sweetness' than the Control.

HunterLab, colour measurement, was also performed.

TABLE 10

L-value of crust, day 1 after baking

| | Control | Enzyme solution A | Enzyme solution C |
|---|---|---|---|
| L-value | 55.3 | 43.6 | 40.5 |

It can be seen from Table 10 that the enzyme solutions A and C clearly give a darker crust than the Control.

The invention claimed is:

1. A method of producing a dough with a reduced amount of added sugar comprising adding a raw starch degrading alpha-amylase and a glucoamylase to dough ingredients comprising flour, water, and yeast, wherein the raw starch degrading alpha-amylase is a GH13_1 amylase and is added in an amount of 0.1-5 mg enzyme protein per kg flour, and wherein the amount of added sugar is reduced by at least 10% (w/w) compared to the amount of sugar added to otherwise the same dough where the sugar is not reduced and where a raw starch degrading alpha-amylase and a glucoamylase are not added.

2. The method according to claim 1, wherein the raw starch degrading alpha-amylase has an amino acid sequence having at least 85% sequence identity to SEQ ID NO: 1.

3. The method according to claim 1, wherein the glucoamylase is added in an amount of 1-1000 mg enzyme protein per kg flour.

4. The method according to claim 1, wherein an additional alpha-amylase is added to dough ingredients comprising flour.

5. The method according to claim 4, wherein the additional alpha-amylase is added in an amount of 0.1-100 mg enzyme protein per kg flour.

6. The method according to claim 1, wherein one or more additional enzymes selected from the group consisting of a maltogenic amylase, beta amylase, aminopeptidase, carboxypeptidase, catalase, cellulytic enzyme, chitinase, cutinase, cyclodextrin glycosyltransferase, deoxyribonuclease, esterase, glucan 1,4-alpha-maltotetrahydrolase, glucanase, galactanase, alpha-galactosidase, beta-galactosidase, glucose oxidase, alpha-glucosidase, beta-glucosidase, haloperoxidase, hemicellulytic enzyme, invertase, laccase, lipase, mannanase, mannosidase, oxidase, pectinolytic enzymes, peptidoglutaminase, peroxidase, phospholipase, phytase, polyphenoloxidase, proteolytic enzyme, ribonuclease, transglutaminase, and xylanase, are added to the dough.

7. The method according to claim 1, wherein the dough ingredients comprise yeast, water, sugar and salt.

8. The method according to claim 1, wherein the dough ingredients comprise fat, oil and/or shortenings.

9. A baking composition comprising a raw starch degrading alpha-amylase in an amount of 0.1-5 mg enzyme protein per kg flour, a glucoamylase, and flour, wherein the raw starch degrading alpha-amylase is a GH13_1 amylase wherein the raw starch degrading alpha-amylase has an amino acid sequence having at least 85% sequence identity to SEQ ID NO: 1.

10. The baking composition according to claim 9, additionally comprising an amylase.

11. A method of improving a property of a dough, the method comprising adding a raw starch degrading alpha-amylase and a glucoamylase to the dough comprising flour, water and yeast, wherein the raw starch degrading alpha-amylase is a GH13_1 amylase and is added in an amount of 0.1-5 mg enzyme protein per kg flour, and wherein the improved property is increased volume of a resultant bread product, compared to a bread product from a dough in which a raw starch degrading alpha-amylase and a glucoamylase are not added.

12. A method of improving a sensory attribute of a bread product baked from a dough, the method comprising adding a raw starch degrading alpha-amylase and a glucoamylase to the dough comprising flour, water and yeast, wherein the raw starch degrading alpha-amylase is a GH13_1 amylase and is added in an amount of 0.1-5 mg enzyme protein per kg flour, and wherein the improved sensory attribute is increased sweetness or increased crumb sweetness of the resultant bread product, compared to a bread product from a dough in which a raw starch degrading alpha-amylase and a glucoamylase are not added.

13. The method according to claim 1, wherein the raw starch degrading alpha-amylase has an amino acid sequence having at least 90% sequence identity to SEQ ID NO: 1.

14. The method according to claim 1, wherein the raw starch degrading alpha-amylase has an amino acid sequence having at least 95% sequence identity to SEQ ID NO: 1.

15. The method according to claim 1, wherein the raw starch degrading alpha-amylase has an amino acid sequence having at least 99% sequence identity to SEQ ID NO: 1.

* * * * *